(12) United States Patent
Fukuhara et al.

(10) Patent No.: US 8,977,444 B2
(45) Date of Patent: Mar. 10, 2015

(54) WORK VEHICLE AND WORK VEHICLE CONTROL METHOD

(75) Inventors: Satoshi Fukuhara, Hiratsuka (JP); Makito Yahata, Komatsu (JP); Yukihiro Nakanishi, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 18 days.

(21) Appl. No.: 13/577,434

(22) PCT Filed: Jan. 31, 2011

(86) PCT No.: PCT/JP2011/051882
§ 371 (c)(1),
(2), (4) Date: Aug. 6, 2012

(87) PCT Pub. No.: WO2011/102209
PCT Pub. Date: Aug. 25, 2011

(65) Prior Publication Data
US 2012/0310493 A1    Dec. 6, 2012

(30) Foreign Application Priority Data
Feb. 16, 2010  (JP) .................................. 2010-031463

(51) Int. Cl.
*E02F 9/20* (2006.01)
*F16H 61/14* (2006.01)

(52) U.S. Cl.
CPC .............. *F16H 61/143* (2013.01); *E02F 9/202* (2013.01); *E02F 9/2079* (2013.01); *B60Y 2200/41* (2013.01)
USPC .......................................... 701/50; 180/65.21

(58) Field of Classification Search
CPC ...................................................... E02F 9/202
USPC ................................ 701/50; 180/65.2; 74/335
See application file for complete search history.

(56) References Cited

U.S. PATENT DOCUMENTS

| | | | |
|---|---|---|---|
| 7,673,714 B2 * | 3/2010 | Soliman et al. .......... | 180/65.265 |
| 2006/0085118 A1 * | 4/2006 | Baldwin ......................... | 701/50 |
| 2009/0013810 A1 * | 1/2009 | Nakagawa et al. .............. | 74/335 |

FOREIGN PATENT DOCUMENTS

| | | |
|---|---|---|
| JP | 5-319143 A | 12/1993 |
| JP | 2002-174332 A | 6/2002 |
| JP | 2009-103258 A | 5/2009 |
| JP | 2009-103266 A | 5/2009 |
| WO | WO-2009/054256 A1 | 4/2009 |

OTHER PUBLICATIONS

International Search Report of corresponding PCT Application No. PCT/JP2011/051882.

* cited by examiner

*Primary Examiner* — Redhwan k Mawari
*Assistant Examiner* — Rodney P King
(74) *Attorney, Agent, or Firm* — Global IP Counselors, LLP (57) ABSTRACT

A work vehicle includes an engine, a travel device, a hydraulic pump, a work implement, a torque converter device, and a controller. The torque converter includes a torque converter and a lockup clutch. The controller is configured to switch the lockup clutch between a connected state and a non-connected state in accordance with a travel state of the work vehicle. The controller is configured to determine whether load increase conditions associated with an increase in load on the work implement are satisfied, and to control the lockup clutch so that the lockup clutch is in the non-connected state when the load increase conditions are satisfied.

6 Claims, 9 Drawing Sheets

WORK VEHICLE AND WORK VEHICLE CONTROL METHOD

CROSS-REFERENCE TO RELATED APPLICATIONS

This application claims priority to Japanese Patent Application No. 2010-031463 filed on Feb. 16, 2010, the disclosure of which is hereby incorporated herein by reference in its entirety.

TECHNICAL FIELD

The present invention relates to a work vehicle and a work vehicle control method.

BACKGROUND ART

In a wheel loader or other work vehicle, a travel device and hydraulic pump are driven by a drive force from an engine. Driving of the travel device causes the vehicle to travel. Driving the hydraulic pump causes hydraulic fluid to be fed from the hydraulic pump to the work implement. The work implement is thereby driven.

There are also work vehicles comprising a torque converter device having a torque converter and a lockup clutch. The torque converter device transmits the drive force from the engine to the travel device via the torque converter when the lockup clutch is in a non-connected state (this state is hereinafter referred to as "torque conversion travel"). When the lockup clutch is in a connected state, the torque converter device transmits the drive force from the engine to the travel device via the lockup clutch (this state is hereinafter referred to as "lockup travel"). Switching the lockup clutch between the connected state and the non-connected state is automatically carried out by a controller. The controller switches the lockup clutch between the connected state and the non-connected state in accordance with the travel state of the vehicle. For example, the controller switches the lockup clutch from the non-connected state to the connected state when the vehicle speed reaches a predetermined switch speed (see Japanese Laid-open Patent Application No. 2009-103258).

SUMMARY

A work vehicle such as that described above is not limited to travel alone; the work implement is sometimes driven while the vehicle is traveling. In such a state, the engine speed is reduced when the lockup clutch is placed in a connected state, whereby the discharge rate of the hydraulic fluid from the hydraulic pump is reduced. In this case, the actuation of the work implement slows and work efficiency is reduced.

In order to avoid a loss of work efficiency as described above, an operator operates a switch or the like to nullify control for switching the lockup clutch by the controller. Therefore, lockup travel is not actually effectively used during work as described above, regardless of the excellent effect in which fuel consumption is reduced to below that of torque conversion travel.

An object of the present invention is to minimize a reduction in work efficiency and to improve fuel consumption in a work vehicle.

The work vehicle according to a first aspect of the present invention comprises an engine, a travel device, a hydraulic pump, a work implement, a torque converter device, and a controller. The travel device is driven by a drive force of from the engine to cause the vehicle to travel. The hydraulic pump is driven by the drive force from the engine and discharges hydraulic fluid. The work implement is driven by hydraulic fluid from the hydraulic pump. The torque converter device has a torque converter and a lockup clutch, and transmits the drive force from the engine to the travel device. The controller switches the lockup clutch between a connected state and a non-connected state in accordance with the travel state of the vehicle. The controller is configured to determine whether load increase conditions associated with an increase in load on the work implement are satisfied. Also, the controller is configured to control the lockup clutch so that the lockup clutch is in a non-connected state when the load increase conditions are satisfied.

In this work vehicle, the lockup clutch is controlled so that the lockup clutch is in a non-connected state in a work phase in which a large load is imposed on the work implement. Therefore, the work vehicle can perform work using the work implement in a state in which the lockup clutch is in a non-connected state. It is thereby possible to minimize a reduction in the work efficiency of the work implement in comparison with the case in which work is performed in a state in which the lockup clutch is in a connected state. Also, lockup travel is used in a work phase in which a large load is not imposed on the work implement, whereby fuel consumption can be improved.

The work vehicle according to a second aspect of the present invention is the work vehicle according to the first aspect, wherein the controller is configured to inhibit the lockup clutch from switching to the connected state and keeps the lockup clutch in the non-connected state when the load increase conditions are satisfied in the case that the lockup clutch is in the non-connected state.

In this work vehicle, the lockup clutch is inhibited from switching to the connected state and the lockup clutch is kept in a non-connected state in a work phase in which a large load is imposed on the work implement. Therefore, the lockup clutch is kept in a non-connected state even when other conditions for determining the switch to the non-connected state of the lockup clutch have been satisfied. Accordingly, the work vehicle can perform work using the work implement in a state in which the lockup clutch is in a non-connected state. It is thereby possible to minimize a reduction in work efficiency by the work implement.

The work vehicle according to a third aspect of the present invention is the work vehicle according to the first aspect, Wherein the controller is configured to switch the lockup clutch from the connected state to the non-connected state when the load increase conditions are satisfied in the case that the lockup clutch is in a connected state.

In this work vehicle, the lockup clutch is switched from the connected state to the non-connected state in a work phase in which a large load is imposed on the work implement. Therefore, even if the lockup clutch is in the connected state in a work phase in which a large load is not imposed on the work implement, the work vehicle can perform work using the work implement in a state in which the lockup clutch is in a non-connected state when a change is made to a work phase in which a large load is to be imposed on the work implement. It is thereby possible to minimize a reduction in work efficiency by the work implement.

The work vehicle according to a fourth aspect of the present invention is the work vehicle according to the first aspect, further comprising: a work implement operation member for operating the work implement; and a work implement operation detector for detecting the operation amount of the work implement operation member. The load increase conditions include that the operation amount of the work implement operation member is greater than a predetermined operation amount threshold value.

An operation amount of the work implement operation member being greater than a predetermined operation amount threshold value indicates that the work vehicle is in a state in which the load on the work implement is predicted to increase. Accordingly, the lockup clutch can be inhibited from switching to the connected state before the load on the work implement increases. Alternatively, the lockup clutch can be switched from the connected state to the non-connected state before the load on the work implement increases. It is thereby possible to minimize a reduction in work efficiency by the work implement when the load on the work implement has increased.

The work vehicle according to a fifth aspect of the present invention is the work vehicle according to the fourth aspect, wherein the work implement has a boom that vertically pivots in accordance with operation of the work implement operation member, and a work attachment attached to a distal end of the boom.

In this work vehicle, when the work implement operation member is operated, the boom thereafter moves up and down. At this time, a large load is imposed on the work implement. In particular, a larger load is imposed on the work implement as the operation amount of the work implement operation member increases. Therefore, in this work vehicle, it is possible to predict in advance with good precision that the load on the work implement will increase, and to control the lockup clutch. It is thereby possible to minimize a reduction in work efficiency by the work implement when the load on the work implement has increased.

The work vehicle according to a sixth aspect of the present invention is the work vehicle according to the first aspect, wherein the load increase conditions include that a work phase of the work vehicle is excavation.

The fact that the work phase of the work vehicle is excavation indicates that the work vehicle is in a state in which the load on the work implement is predicted to increase. Accordingly, it is possible to predict with good precision that the load on the work implement will increase, and to control the lockup clutch. It is thereby possible to minimize a reduction in work efficiency by the work implement when the load on the work implement has increased.

The work vehicle according to a seventh aspect of the present invention is the work vehicle according to the fourth aspect, wherein the travel device has a transmission capable of changing gears from a first speed to a third speed or higher speed stages. The load increase conditions include that the speed stage of the transmission is second speed.

In this work vehicle, the load increase conditions include that the speed stage of the transmission is second speed. In the work vehicle, the speed stage of the transmission is often second speed when work using the work implement is performed. Accordingly, it is possible to minimize a reduction in work efficiency by the work implement.

The work vehicle according to an eighth aspect of the present invention is the work vehicle according to the fourth aspect, further comprising a vehicle speed detector for detecting vehicle speed. The load increase conditions include that the vehicle speed is equal to or less than a predetermined speed threshold value.

The vehicle speed can also be used to determine whether the work vehicle is in a state in which the load on the work implement is predicted to increase. This is due to the fact that the driving of the travel device is given greater priority than the work implement when the vehicle speed is greater than a predetermined speed threshold value, i.e., when the vehicle is traveling at high speed. Conversely, the work implement is given greater priority than the travel device when the vehicle is traveling at low speed. Therefore, with this work vehicle, it is possible to minimize a reduction in work efficiency by the work implement.

The work vehicle according to a ninth aspect of the present invention is the work vehicle according to the second aspect, wherein the controller cancels the inhibiting of switching the lockup clutch to the connected state when a predetermined time has elapsed from the time point at which the load increase conditions are no longer satisfied.

In this work vehicle, the switch of the lockup clutch to a connected state is prevented from being immediately executed at the point in time that a load increase condition is no longer satisfied. Switching the lockup clutch can thereby be prevented from being repeated in a short period of time.

The method for controlling a work vehicle according to a tenth aspect of the present invention is a method for controlling a work vehicle that comprises an engine, a travel device, a hydraulic pump, a work implement, a torque converter device, and a controller. This control method comprises the following steps: a step for switching the lockup clutch between a connected state and a non-connected state in accordance with a travel state of the vehicle; a step for determining whether load increase conditions associated with an increase in load on the work implement are satisfied; and a step for controlling the lockup clutch so that the lockup clutch is in a non-connected state when the load increase conditions are satisfied.

In this method for controlling a work vehicle, the lockup clutch is controlled so that the lockup clutch is in a non-connected state in a work phase in which a large load is imposed on the work implement. It is possible to minimize a reduction in work efficiency by the work implement in comparison with the case in which work is performed with the lockup clutch in a connected state. Lockup travel is used in a work phase in which a large load is not imposed on the work implement, whereby fuel consumption can be improved.

In the present invention, reduction in work efficiency can be minimized and fuel consumption can be improved in a work vehicle.

DESCRIPTION OF EMBODIMENTS

Figure 1:
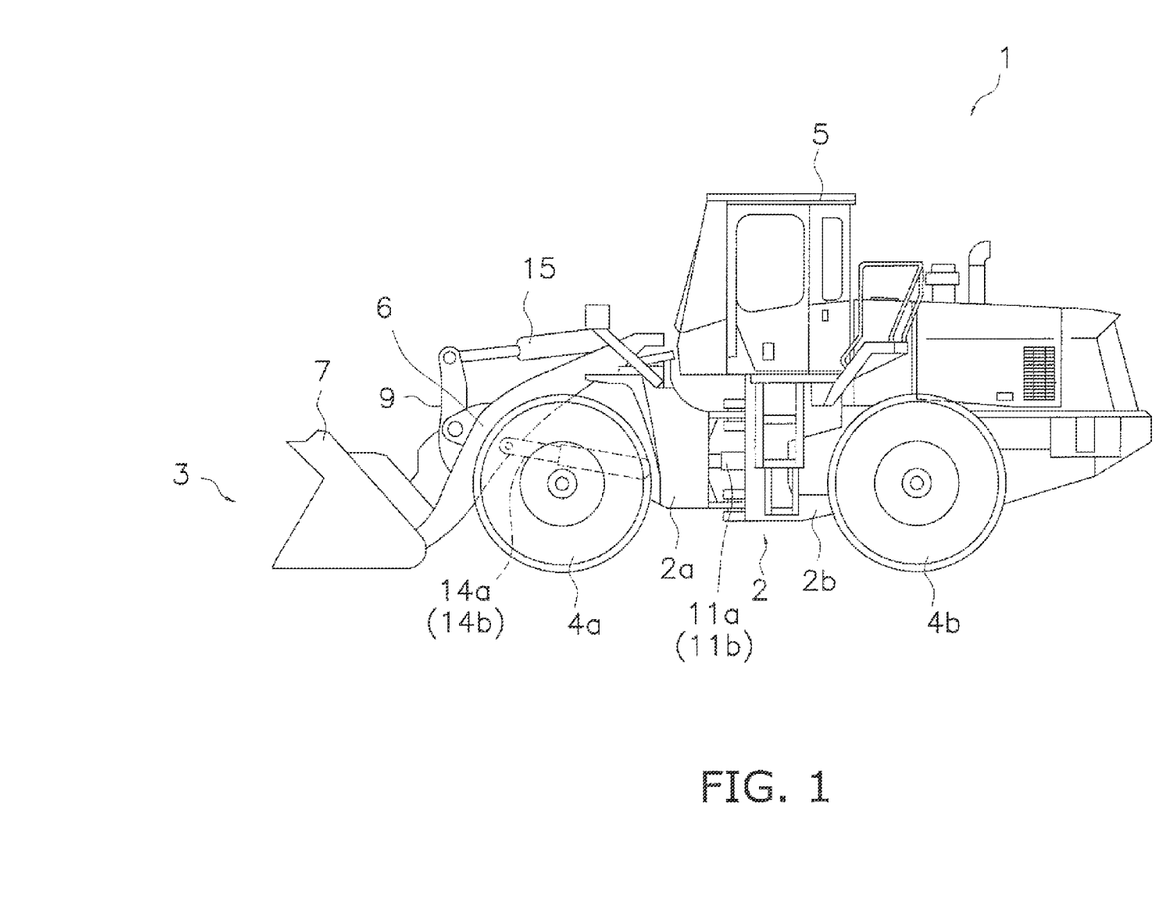
FIG. 1 is a side view of the work vehicle according to an embodiment of the present invention.
Figure 2:
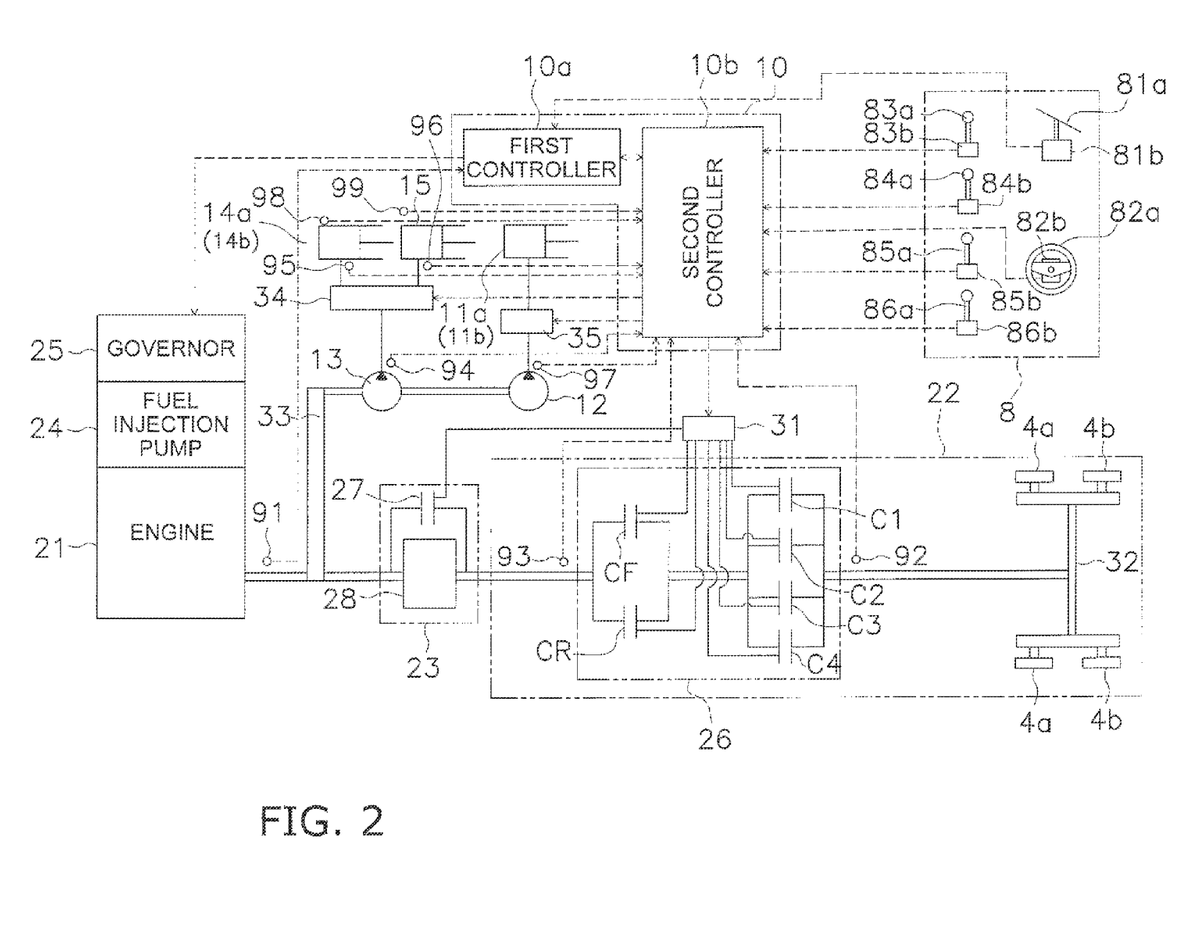
FIG. 2 is a schematic view showing the configuration of the work vehicle.

The work vehicle 1 according to an embodiment of the present invention is shown in FIGS. 1 and 2. FIG 1 is a view of the external appearance of the work vehicle 1, and FIG. 2 is a schematic view showing the configuration of the work vehicle 1. The work vehicle 1 is a wheel loader, and the work vehicle 1 is capable of traveling by front wheels 4a and rear wheels 4b being rotatably driven, and is capable performing desired work using a work implement 3.

The work vehicle 1 comprises a vehicle body frame 2, a work implement 3, front wheels 4a, rear wheels 4b, and a driver cab 5, as shown in FIG 1.

The vehicle body frame 2 has a front vehicle body section 2a and a rear vehicle body section 2b. The front vehicle body section 2a and the rear vehicle body section 2b are connected to each other so as to allow pivoting in the left and right directions. A pair of steering cylinders 11b are provided from the front vehicle body section 2a to the rear vehicle body section 2b. The steering cylinders 11a, 11b are hydraulic cylinders driven by hydraulic fluid from a steering pump 12 (see FIG. 2). The steering cylinders 11a, 11b expand and contract, whereby the front vehicle body section 2a pivots in relation to the rear vehicle body section 2b. The direction of progress of the vehicle is thereby changed. In FIGS. 1 and 2, only one of the steering cylinders 11a, 11b is shown, and the other is omitted.

The work implement 3 and the pair of front wheels 4a are attached to the front vehicle body section 2a. The work implement 3 is driven by the hydraulic fluid from the work implement pump 13 (see FIG. 2). The work implement 3 has a boom 6, a pair of lift cylinders 14a, 14b, bucket 7, and a bucket cylinder 15. The boom 6 is mounted on the front vehicle body section 2a. One end of the lift cylinders 14a, 14b is attached to the front vehicle body section 2a. The other end of the lift cylinders 14a, 14b is attached to the boom 6. The lift cylinders 14a, 14b expand and contract by hydraulic fluid from the work implement pump 13, whereby the boom 6 vertical pivots in accordance with operation of a later-described boom operation member 83a. In FIGS. 1 and 2, only one of the lift cylinders 14a, 14b is shown, and the other is omitted. The bucket 7 is attached to the distal end of the boom 6. One end of the bucket cylinder 15 is attached to the front vehicle body section 2a. The other end of the bucket cylinder 15 is attached to the bucket 7 via a bell crank 9. The bucket cylinder 15 expands and contracts by hydraulic fluid from the work implement pump 13, whereby the bucket 7 vertically pivots in accordance with operation of a bucket operation member 84a.

The driver cab 5 and the pair of rear wheels 4b are attached to the rear vehicle body section 2b. The driver cab 5 is disposed above the vehicle body frame 2, and houses a seat on which an operator sits, a later-described operation unit 8, and the like.

The work vehicle 1 comprises an engine 21, a torque converter device 23, a travel device 22, a work implement pump 13, a steering pump 12, an operation unit 8, a controller 10, and the like, as shown in FIG. 2.

The engine 21 is a diesel engine, and the fuel amount injected into the cylinder is adjusted to control the output of the engine 21. This adjustment is made by a later-described first controller 10a, which controls an electronic governor 25 installed in a fuel injection pump 24 of the engine 21. A general all-speed control governor is used as the governor 25, and the engine speed and fuel injection amount are adjusted in accordance with a load so that the engine speed achieves a target speed that corresponds to a later-described accelerator operation amount. In other words, the governor 25 increases or reduces the fuel injection amount so that there is no deviation between a target engine speed and the actual engine speed. The engine speed is detected by an engine speed sensor 91. The detection signal of the engine speed sensor 91 is inputted to the first controller 10a.

The torque converter device 23 has a lockup clutch 27 and a torque converter 28. The lockup clutch 27 can be switched between a connected state and a non-connected state. The torque converter 28 transmits the drive force from the engine 21 using oil as a medium to the travel device 22 when the lockup clutch 27 is in a non-connected state (this state is hereinafter referred to as "torque conversion travel"). The input side and the output side of the torque converter 28 are directly connected when the lockup clutch 27 is in a connected state. The drive force from the engine 21 is transmitted to the travel device 22 via the lockup clutch 27 (this state is hereinafter referred to as "lockup travel"). The lockup clutch 27 is a hydraulic pressure-actuated clutch, and the feeding of hydraulic fluid to the lockup clutch 27 is controlled by a later-described second controller 10b via a clutch control valve 31 to thereby switch between the connected state and the non-connected state.

The travel device 22 is a device for causing the vehicle to travel by the drive force from the engine 21. The travel device 22 has a transmission 26, the above-described front wheels 4a and rear wheels 4b, and the like.

A transmission 26 has a forward clutch CF adapted for forward travel stages and a reverse clutch CR adapted for reverse travel stages. The clutches CF, CR are switched between the connected state and the non-connected state to thereby switch the vehicle between forward and reverse. The vehicle is in a neutral state when the clutches CF, CR are both in the non-connected state. The transmission 26 has a plurality of speed stage clutches C1 to C4 adapted for a plurality of speed stages, and can switch the reduction gear ratio to a plurality of stages. For example, in the transmission 26, four speed stage clutches C1 to C4 are provided, and the speed stages can be switched to four stages, i.e., first speed to fourth speed. The speed stage clutches CI to C4 are hydraulic pressure-actuated hydraulic clutches. Hydraulic fluid is fed from a hydraulic pump (not shown) to the clutches C1 to C4 via the clutch control valve 31. The clutch control valve 31 is controlled by the second controller 10b, and the feeding of the hydraulic fluid to the clutches C1 to C4 is controlled, whereby the connected state and non-connected state of the clutches C1 to C4 are switched.

A T/M output speed sensor 92 for detecting the speed of the output shaft of the transmission 26 is provided to the output shaft of the transmission 26. Detection signals from the T/M output speed sensor 92 are inputted to the second controller 10b. The second controller 10b calculates the vehicle speed on the basis of the detection signals of the T/M output speed sensor 92. Therefore, the T/M output speed sensor 92 functions as a vehicle speed detector for detecting the vehicle speed. A sensor for detecting the rotational speed of other components may be used as a vehicle speed detector in lieu of the output shaft of the transmission 26. The drive force outputted from the transmission 26 is transmitted to the front wheels 4a and the rear wheels 4b via a shaft 32, and the like, whereby the vehicle travels. The speed of the input shaft of the transmission 26 is detected by a T/M input speed sensor 93. The detection signals from the T/M input speed sensor 93 are inputted to the second controller 10b.

A portion of the drive force of the engine 21 is transmitted to the steering pump 12 and the work implement pump 13 via a PTO shaft 33. The work implement pump 13 and the steering pump 12 are hydraulic pumps driven by drive force from the engine 21. The hydraulic fluid discharged from the work implement pump 13 is fed to the lift cylinders 14a, 14b and the bucket cylinder 15 via a work implement control valve 34.

The hydraulic fluid discharged from the steering pump 12 is fed to the steering cylinders 11a, 11b via a steering control valve 35. In this manner, the work implement 3 is driven by a portion of the drive force from the engine 21.

The pressure of the hydraulic fluid discharged from the work implement pump 13 (hereinafter referred to as "hydraulic pressure of the work implement pump") is detected by a first hydraulic pressure sensor 94. The pressure of the hydraulic fluid fed to the lift cylinders 14a, 14b (hereinafter referred to as "lift cylinder hydraulic pressure") is detected by a second hydraulic pressure sensor 95. Specifically, the second hydraulic pressure sensor 95 detects the hydraulic pressure in the cylinder head chamber to which hydraulic fluid is fed when the lift cylinders 14a, 14b are extended. The pressure of the hydraulic fluid fed to the bucket cylinder 15 (hereinafter referred to as "hydraulic pressure of the bucket cylinder") is detected by a third hydraulic pressure sensor 96. Specifically, the third hydraulic pressure sensor 96 detects the hydraulic pressure of the cylinder head chamber to which hydraulic fluid is fed when the bucket cylinder 15 is extended. The pressure of the hydraulic fluid discharged from the steering pump 12 (hereinafter referred to as "hydraulic pressure of the steering pump") is detected by a fourth hydraulic pressure sensor 97. The detection signals from the first to fourth hydraulic pressure sensors 94 to 97 are inputted to the second controller 10b.

The operation unit 8 is operated by the operator. The operation unit 8 has an accelerator operation member 81a, an accelerator operation detection device 81b, a steering operation member 82a, a steering operation detection device 82b, a boom operation member 83a, a boom operation detection device 83b, a bucket operation member 84a, a bucket operation detection device 84b, a gear shift operation member 85a, a gear shift operation detection device 85b, an FR operation member 86a, an FR operation detection device 86b, and the like.

The accelerator operation member 81a is, e.g., an accelerator pedal, and is operated in order to set the target speed of the engine 21. The accelerator operation detection device 81b detects the operation amount of the accelerator operation member 81a (hereinafter referred to as "accelerator operation amount"). The accelerator operation detection device 81b outputs the detection signal to the first controller 10a.

The steering operation member 82a is, e.g., a steering wheel, and is operated in order to operate the direction of progress of the vehicle. The steering operation detection device 82b detects the position of the steering operation member 82a and outputs detection signals to the second controller 10b. The second controller 10b controls the steering control valve 35 on the basis of detection signals from the steeling operation detection device 82b. The steering cylinders 11a, 11b thereby expand and contract, and the direction of progress of the vehicle is changed.

The boom operation member 83a and the bucket operation member 84a (work implement operation member) is, e.g., an operation lever, and is operated in order to actuate the work implement 3. Specifically, the boom operation member 83a is operated in order to actuate the boom 6. The bucket operation member 84a is operated in order to actuate the bucket 7. The boom operation detection device 83b (work implement operation detector) detects the position of the boom operation member 83a.The operation amount of the boom operation member 83a is thereby detected. The bucket operation detection device 84b (work implement operation detector) detects the position of the bucket operation member 84a.The operation amount of the bucket operation member 84a is thereby detected. The boom operation detection device 83b and the bucket operation detection device 84b output detection signals to the second controller 10b. The second controller 10b controls the work implement control valve 34 on the basis of detection signals from the boom operation detection device 83b and the bucket operation detection device 84b. The lift cylinders 14a, 14b and the bucket cylinder 15 thereby expand and contract and the boom 6 and the bucket 7 are actuated. Also, a boom angle detection device 98 for detecting the boom angle and a bucket angle detection device 99 for detecting the bucket angle are provided to the work implement 3. The boom angle is, e.g., the angle in relation to the horizontal direction, which is the direction in which the rear end part and the front end part of the boom 6 are connected. The boom angle detection device 98 outputs detection signals to the second controller 10b. The bucket angle is, e.g., the angle in relation to the horizontal direction, Which is the direction along the tip of the bucket 7. The bucket angle detection device 99 outputs detection signals to the second controller 10b.

The gear shift operation member 85a is, e.g., a shift lever. The gear shift operation member 85a is operated in order to set an upper limit of the speed stage (hereinafter referred to as "maximum speed stage"). The gear shift operation detection device 85b detects the position of the gear shift operation member 85a. The gear shift operation detection device 85b outputs detections signals to the second controller 10b. The second controller 10b controls the gear shifting of the transmission 26 on the basis of the detection signals from the gear shift operation detection device 85b.

The FR operation member 86a is operated in order to switch the vehicle between forward and reverse. The FR operation member 86a is switched to forward, neutral, and reverse positions. The FR operation detection device 86b detects the position of the FR operation member 86a. The FR operation detection device 86b outputs detection signals to the second controller 10b. The second controller 10b controls the clutch control valve 31 on the basis of the detection signals from the FR operation detection device 86b. The forward clutch CF and the reverse clutch CR are thereby controlled to switch the vehicle between forward, reverse, and neutral states.

The controller 10 has a first controller 10a and a second controller 10b. Each of the first controller 10a and the second controller 10b can be implemented in the form of a computer having a storage device used as, e.g., program memory and/or work memory, and a CPU for executing a program.

Figure 3:
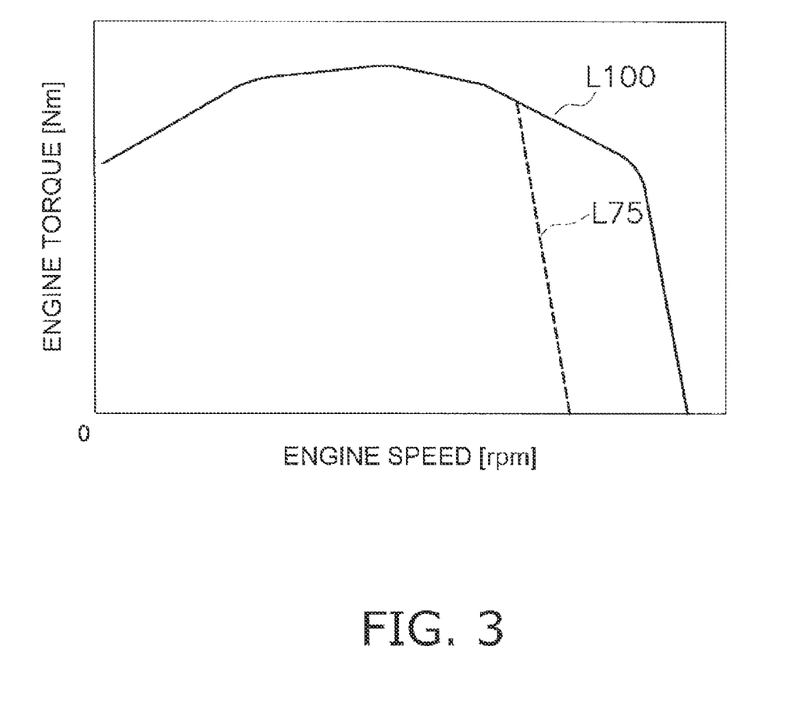
FIG. 3 is a view showing an example of the engine torque curve.

The first controller 10a sends engine command signals to the governor 25 so as to achieve a target engine speed that corresponds to the accelerator operation amount. FIG. 3 shows the engine torque curve representing a torque upper limit value that can be outputted by the engine 21 in accordance with the engine speed. In FIG. 3, the solid line L100 indicates the engine torque curve when the accelerator operation amount is 100%. The engine torque curve corresponds to, e.g., the rated or maximum power output of the engine 21. The 100% accelerator operation amount refers to the state in which the accelerator operation member 81a is maximally operated. Also, the broken line L75 indicates the engine torque curve when the accelerator operation amount is 75%. The governor 25 controls the output of the engine 21 so that the output torque of the engine 21 (hereinafter referred to as "engine torque") becomes equal to or less than the engine torque curve. The control of the output of the engine 21 is carried out by, e.g., controlling the upper limit value of fuel injection amount to the engine 21. When the first controller 10a receives a later-described correction command signal from the second controller 10b, the first controller corrects the command value of the engine command signal using the correction command signal, and sends the corrected command value to the governor 25.

The second controller 10b controls the transmission 26 and/or the torque converter device 23 in accordance with the travel state of the vehicle. The second controller 10b automatically changes the speed stage of the transmission 26 and switches the lockup clutch 27 in accordance with the vehicle speed. Specifically, gears are changed in the sequence of second speed torque conversion travel, second speed lockup travel, third speed torque conversion travel, third speed lockup travel, fourth speed torque conversion travel, and fourth speed lockup travel, in accordance with the increase in vehicle speed. For example, second speed torque conversion travel refers to a power transmission state in which the speed stage of the transmission 26 is second speed and the lockup clutch 27 is in the non-connected state. Second speed lockup travel refers to a power transmission state in which the speed stage of the transmission 26 is second speed and the lockup clutch 27 is in the connected state. The other power transmission states are similarly defined by the combination of the speed stage number of the transmission 26 and the state of the lockup clutch 27. However, when the maximum speed stage is set to third speed, the gear is changed in a range from second speed torque conversion travel to third speed lockup travel. When the maximum speed stage is set to second speed, the gear is changed in a range from second speed torque conversion travel to second speed lockup travel. First speed torque conversion travel is set when the maximum speed stage is set to first speed. It is possible for a lockup function setting member (not shown) to set the configuration so that lockup travel is not executed. Lockup travel is not executed when lockup is inhibited by a later-described lockup inhibition control. In these cases, the second controller 10b changes gears in the sequence of second speed torque conversion travel, third speed torque conversion travel, and fourth speed torque conversion travel, in accordance with the increase in vehicle speed.

The detection signals of the input pressure, the output pressure, and the like of the torque converter device 23 are inputted to the second controller 10b in addition to the above-described detection signals. The first controller 10a and the second controller 10b can communicate with each other by a wireless or wired connection. The detection signals of the engine speed, the fuel injection amount, the accelerator operation amount, and the like are inputted from the first controller 10a to the second controller 10b. The second controller 10b calculates a correction value for correcting the command value of the engine command signal on the basis of these signals. The second controller 10b transmits a correction command signal that corresponds to the correction value to the first controller 10a. This correction value is a value required for obtaining a desired reduction amount in the torque upper limit value. The first controller 10a and the second controller 10b can thereby bring the torque upper limit value to a desired value.

The second controller 10b executes lockup inhibition control for controlling the lockup clutch so that the lockup clutch is in the non-connected state when predetermined load increase conditions are satisfied. Specifically, when the load increase conditions are satisfied in the case that the lockup clutch 27 is in the non-connected state, the lockup clutch 27 is inhibited from switching from the non-connected state to the connected state (hereinafter referred to as "lockup") and the lockup clutch 27 is kept in the non-connected state. Also, when the load increase conditions have been satisfied in the case that the lock-up clutch 27 is in the connected state, the lockup clutch 27 is switched from the connected state to the non-connected state. The predetermined load increase conditions are conditions that indicate that the work vehicle 1 is in a situation that leads to an increase in the load on the work implement 3. Lockup inhibition control is described below with reference to the flowchart shown in FIGS. 4 to 6.

Figure 4:
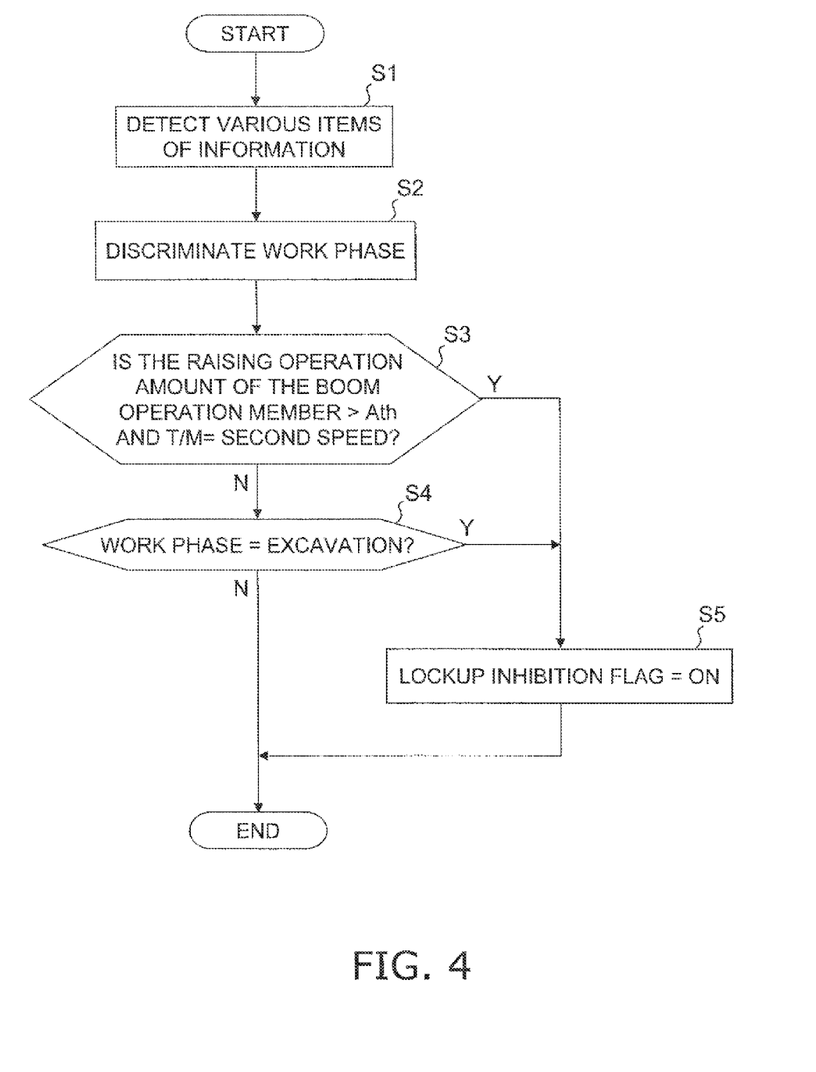
FIG. 4 is a flowchart showing the process in lockup inhibition control.

The flowchart shown in FIG. 4 shows the process for determining whether lockup is to be inhibited, in a state in which lockup is not inhibited, i.e., a state in which a later-described lockup inhibition flag is OFF.

In the first step S1, various items of information are detected. In this step, various items of information are sent to the first controller 10a and the second controller 10b by way of the above-described detection signals. For example, the position of the gear shift operation member 85a, the operation amount of the boom operation member 83a and the bucket operation member 84a, the vehicle speed, and other information are sent to the second controller 10b as detection signals.

In the second step S2, the work phase is discriminated. Specifically, the second controller 10b discriminates the work phase in the following manner.

First, the second controller 10b discriminates the travel status and the work status of the vehicle on the basis of the above-described detection signals. The travel status includes "stop," "forward," and "reverse." In the case that the vehicle speed is equal to or less than a predetermined stop threshold value, the second controller 10b determines that the travel status is "stop," The predetermined stop threshold value is a value that is sufficiently low enough to allow the vehicle to be considered to be stopped. In the case that the FR operation member 86a is set in the forward position and the vehicle is moving forward, the second controller 10b determines that the travel status is "forward." In the case that FR operation member 86a is set to reverse position and the vehicle is moving in reverse, the second controller 10b determines that the travel status is "reverse."

The work status includes "cargo-loaded," "no-cargo," and "excavation." The second controller 10b determines that the work status is "cargo-loaded" in the case that the lift cylinder hydraulic pressure is equal to or greater than a predetermined cargo-loaded threshold value. The second controller 10b determines that the work status is "no-cargo" in the case that the lift cylinder hydraulic pressure is less than the cargo-loaded threshold value. In other words, the term "no-cargo" refers to a state in which cargo is not loaded in the bucket 7, and the term "cargo-loaded" refers to a state in which cargo is loaded in the bucket 7. Therefore, the predetermined load threshold value is a value that is greater than the value of the lift cylinder hydraulic pressure in a state in which cargo is not loaded into the bucket 7, and is the value of the lift cylinder hydraulic pressure in which it can be deemed that cargo is loaded into the bucket 7. The second controller 10b determines the work status to be "excavation" in the case that the lift cylinder hydraulic pressure is equal to or greater than a predetermined excavation hydraulic pressure threshold value, the travel status is "forward", and the boom angle is equal to or less than a predetermined excavation angle threshold value. The term "excavation" refers to work in which the vehicle drives the bucket 7 into soil and lifts while moving forward. Therefore, the excavation hydraulic pressure corresponds to the value of the lift cylinder hydraulic pressure during excavation work. Also, the excavation angle threshold value corresponds to the value of the boom angle during excavation work. The second controller 10b discriminates the work phase by a combination of the travel status and the work status. Specifically, the work phase is discriminated in the seven phases of "no-cargo stopped,""cargo-loaded stopped,"

"no-cargo forward," "cargo-loaded forward," "no-cargo reverse," "cargo-loaded reverse," and "excavation."

In a third step S3 and a fourth step S4, it is determined whether the load increase conditions have been satisfied. Specifically, in the third step S3, it is determined whether the lift operation amount of the boom operation member 83a is greater than a predetermined operation amount threshold value Ath and the speed stage of the transmission 26 is second speed. Here, it is determined whether the upward operation amount of the boom operation member 83a is greater than the predetermined operation amount threshold value Ath on the basis of the detection signals from the boom operation detection device 83b. The predetermined operation amount threshold value Ath is, e.g., 50%, and is set to a value around which it is predicted that the boom 6 will be moved upward considerably. The operation amount when the boom operation member 83a is positioned in the neutral position is 0%, and the operation amount when boom operation member 83a has been maximally operated is 100%. It is determined whether the actual speed stage of the transmission 26 is second speed. The process proceeds to step S4 when the above-described conditions are not satisfied.

In the fourth step S4, it is determined whether the work phase is excavation. Here, the determination is made on the basis of the discrimination results of the second step S2 described above. The process proceeds to the fifth step S5 in the case that the conditions of either of the third step S3 or the fourth step S4 are satisfied.

In the fifth step S5, the lockup inhibition flag is set to ON. In other words, the lockup inhibition flag is switched from OFF to ON. The switching the lockup clutch 27 to the connected state is thereby inhibited.

In the third step S3 and the fourth step S4 described above, the lockup inhibition flag is kept OFF in the case that any of the load increase conditions are not filled.

Figure 5:
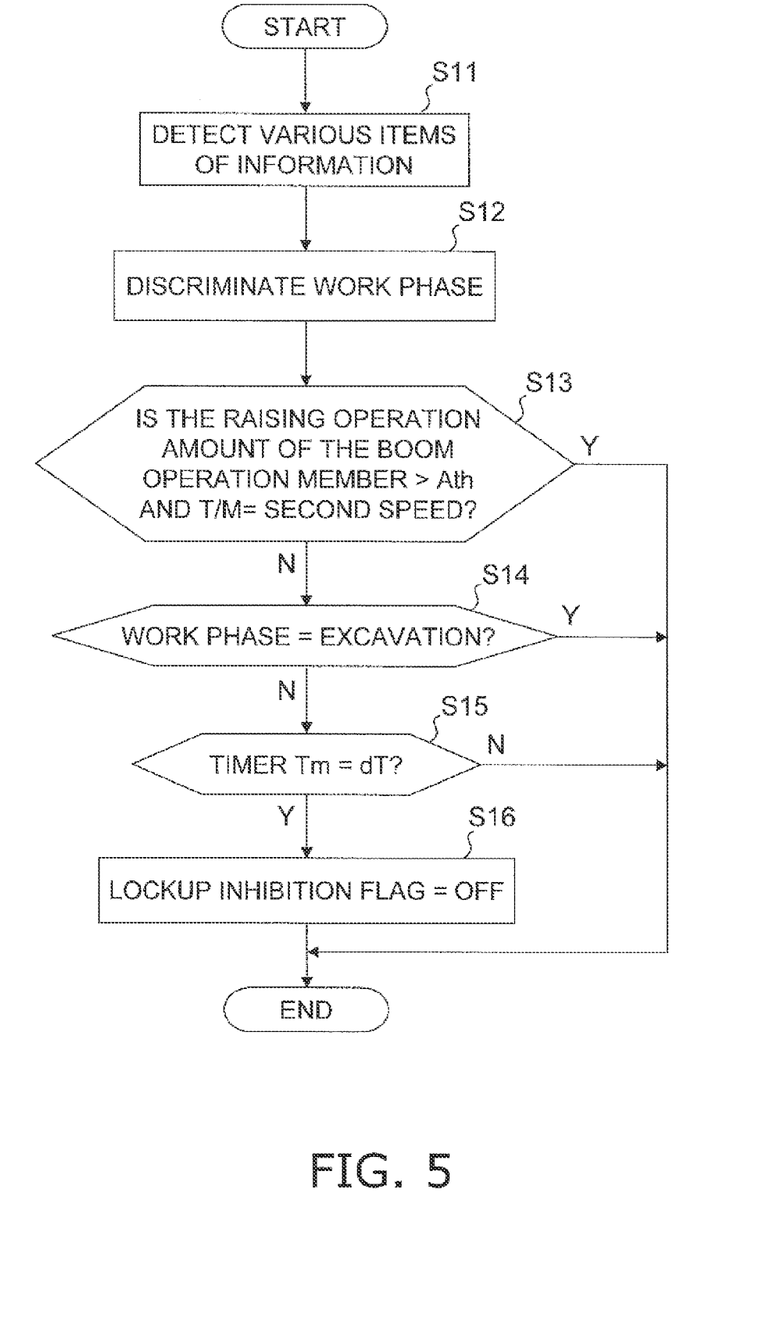
FIG. 5 is a flowchart showing the process in lockup inhibition control.

Next, the flowchart shown in FIG. 5 will be described. The flowchart shown in FIG. 5 shows the process for determining whether lockup inhibition is to be cancelled in a state in which lockup is inhibited, i.e., in a state which the lockup inhibition flag is ON.

The 11th step S11 and the 12th step S12 are the same as the above-described first step S1 and second step S2, respectively.

In the 13th step S13 and the 14th step S14, it is determined whether the load increase conditions are satisfied in the same manner as the third step S3 and the fourth step S4 described above. The process proceeds to the 15th step S15 in the case that the conditions of neither of the 13th step S13 nor the 14th step S14 are satisfied.

In the 15th step S15, it is determined whether a timer Tm has reached a predetermined time dT. The timer Tm starts counting from the point in time that the load increase conditions of the 13th step S13 and the 14th step S14 described above are both no longer satisfied. In other words, in the 15th step S15, it is determined whether the predetermined time dT has elapsed from the point in time that the load increase conditions of the 13th step S13 and the 14th step S14 are both no longer satisfied. The process proceeds to the 16th step S16 when the timer Ta1 has reached a predetermined time.

In the 16th step S16, the lockup inhibition flag is set to OFF. In other words, the lockup inhibition flag is switched from ON to OFF. The inhibition of the lockup clutch 27 from being switched to the connected state is thereby cancelled. In this manner, the second controller 10b cancels the inhibition of the lockup clutch 27 being switched to the connected state when a predetermined time has elapsed from the point in time at which the load increase conditions are no longer satisfied.

Figure 6:
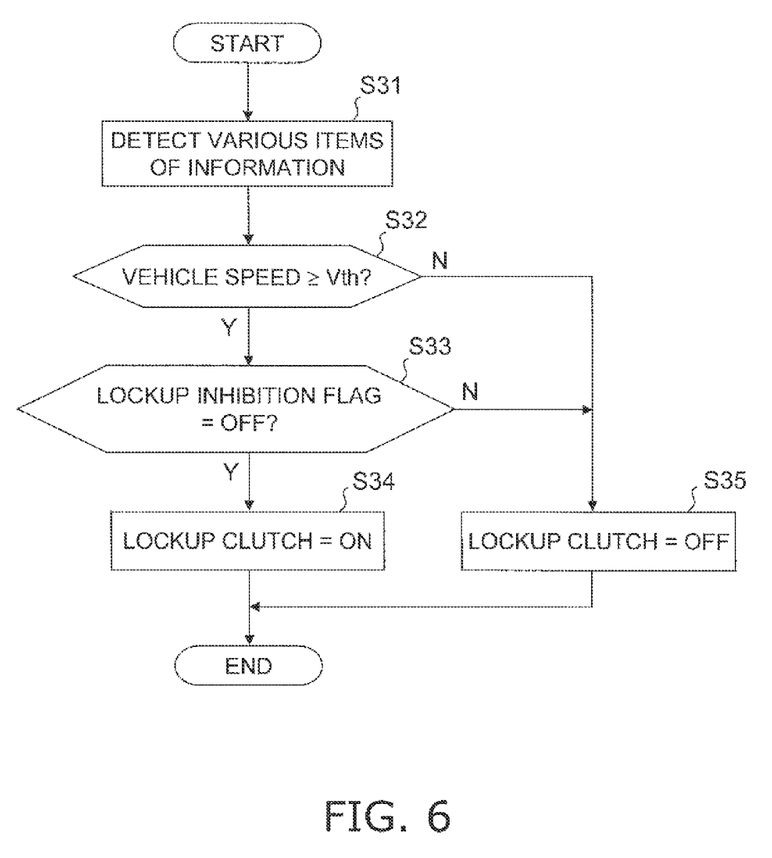
FIG. 6 is a flowchart showing the process in lockup inhibition control.

Next, the flowchart shown in FIG. 6 will be described. The flowchart shown in FIG. 6 shows the process for determining whether the second controller 10b will switch the lockup clutch 27 from a non-connected state to a connected state on the basis of the travel state of the vehicle in the case that the lockup clutch 27 is in a non-connected state.

Various items of information are detected in the 31st step S31. In this particular case, information related to the vehicle speed and the lockup inhibition flag is detected.

In the 32nd step S32, it is determined whether the vehicle speed is equal to or greater than a predetermined switch speed Vth. The switch speed Vth is the speed at which a switch is made from torque conversion travel to lockup travel, and a value is set for each speed stage of the transmission 26. When the vehicle speed is less than the predetermined switch speed Vth, the process proceeds to the 35th step S35, and the lockup clutch 27 is kept in the non-connected state. In the 32nd step S32, the process proceeds to the 33rd step S33 when the vehicle speed is equal to or greater than the predetermined switch speed Vth.

In the 33rd step S33, it is determined whether the lockup inhibition flag is OFF. In the case that the lockup inhibition flag is OFF, the process proceeds to the 34th step S34, and the lockup clutch 27 is switched from a non-connected state to a connected state. In the case that the lockup inhibition flag is ON in the 33rd step S33, the process proceeds to the 35th step S35, and the lockup clutch 27 is kept in a non-connected state, In other words, when the lockup inhibition flag is ON, switching the lockup clutch 27 to the connected state is inhibited even when the vehicle speed has reached the switch speed.

The case in which it will be determined whether the lockup clutch 27 is to be switched from the connected state to the non-connected state is carried out using the same process as FIG. 6 in the case where the lockup clutch 27 is in a connected state. Specifically, when the vehicle speed is less than the switch speed Vth in the 32nd step S32, the lockup clutch 27 is switched from the connected state to the non-connected state in the 35th step S35. In the case that the vehicle speed is equal to or greater than the switch speed Val in the 32nd step S32 and the lockup inhibition flag is OFF in the 33rd step S33, the lockup clutch 27 is kept in the connected state in the 34th step S34. However, the lockup clutch 27 is switched from the connected state to the non-connected state in the 35th step S35 in the case that the lockup inhibition flag is ON in the 33rd step S33, even when the vehicle speed is equal to or greater than the switch speed Vth in the 32nd step S32. In other words, in the case that the lockup clutch 27 is in the connected state, the lockup clutch 27 is switched from the connected state to the non-connected state in the case that the lockup inhibition flag has been switched from OFF to ON. The switch speed when the lock-up clutch 27 is to be switched from the connected state to the non-connected state may be different from the switch speed when the lockup clutch 27 is to be switched from the non-connected state to the connected state.

Figure 7:
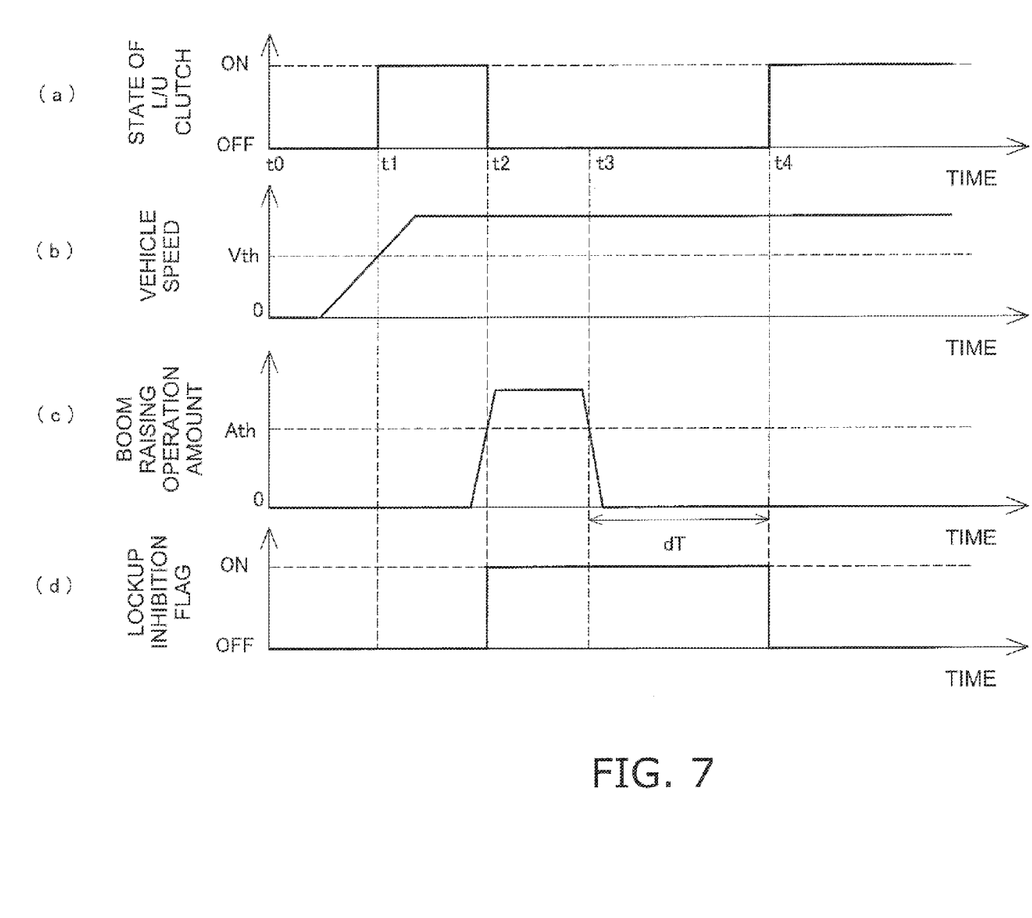
FIG. 7 is a timing chart showing the operation of the lockup clutch in lockup inhibition control.

Next, lockup inhibition control will be described on the basis of the timing chart of FIG. 7. FIG. 7(a) shows the state of the lockup clutch 27, i.e., whether the lockup clutch is in the connected state (ON) or in the non-connected state (OFF). FIG. 7(b) shows the change in the vehicle speed. FIG. 7(c) shows the raising operation amount of the boom operation member 83a. FIG. 7(d) shows the lockup inhibition flag. Also, the speed stage of the transmission 26 is fixed in second speed.

The vehicle speed is 0 at time t0, and the vehicle speed increases thereafter. At this point, the power transmission state of the work vehicle 1 is second-speed torque conversion travel. When the vehicle speed reaches the switch speed Vth at time t1, the lockup clutch 27 is switched from the non-connected state to the connected state. Next, at time t2, the load increase conditions described above are satisfied when the raising operation amount of the boom operation member 83a reaches the operation amount threshold value Ath. At this point, the lockup inhibition flag is set to ON by the lockup inhibition control. The lockup clutch 27 is thereby switched from the connected state to the non-connected state. Next, at time t3, the load increase conditions are no longer satisfied when the raising operation amount of the boom operation member 83a becomes equal to or less than the operation amount threshold value Ath. However, at this point in time, the lockup inhibition flag is kept ON, and the lockup clutch 27 is not switched to the connected state. The lockup inhibition flag is thereafter set to OFF and lockup inhibition is cancelled at time t4 at which the time dT has elapsed from time t3. The lockup clutch 27 is thereby switched from the non-connected state to the connected state.

Figure 8:
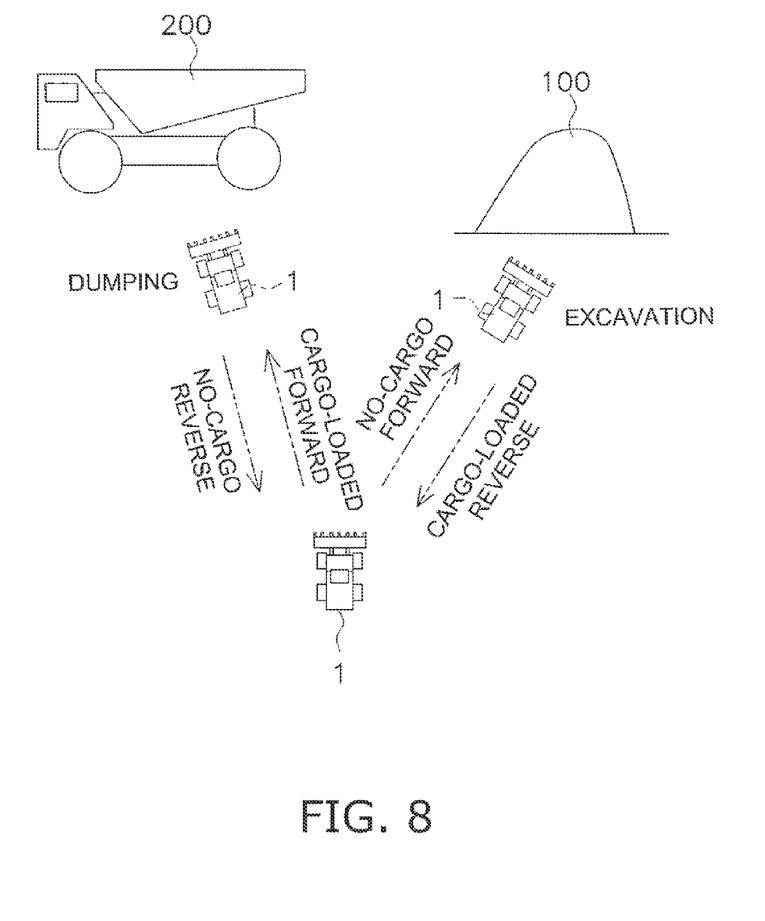
FIG. 8 is a schematic view showing the operation of the vehicle during V-shaped work.

Described next is an example of the process of the lockup inhibition control when the work vehicle 1 is performing so-called V-shaped work. V-shaped work is work in which the work vehicle 1, gradually lifts soil or other cargo 100 using the work implement 3, and loads the cargo into a dump truck or other loading position 200, as shown in FIG. 8. When the V-shaped work is carried out, a movement over a relatively short distance is repeated, and the gear shift operation member 85a is therefore set in the second speed position.

First, the work vehicle 1 moves toward the cargo 100. The work phase at this time is "no-cargo forward." Next, the work vehicle 1 drives into the cargo 100 and lifts the cargo 100 using the bucket 7. The work phase at this time is "excavation." Next, the operator switches the FR operation member 86a from the forward position to the reverse position. The work vehicle 1 moves backward in a state in which the cargo 100 is carried in the bucket 7. At this time, the work phase is "cargo-loaded reverse." Next, the operator switches the FR operation member 86a from the reverse position to the forward position. The work vehicle 1 moves forward toward the loading position 200 in state in which the cargo 100 is carried in the bucket 7. At this time, the work phase is "cargo-loaded forward." Next, the cargo 100 in the bucket 7 is dropped to the loading position 200 in a state in which the work vehicle 1 is positioned near the loading position 200. Although not included in the discrimination of the work phase described above, the work phase at this time is referred to as "dumping." Next, the operator switches the FR operation member 86a from the forward position to the reverse position, and the work vehicle 1 moves in reverse away from the loading position 200. At this time, the work phase is "no-cargo reverse." Next, the operator switches the FR operation member 86a from the reverse position to the forward position and the work vehicle 1 again moves forward toward the cargo 100.

Figure 9:
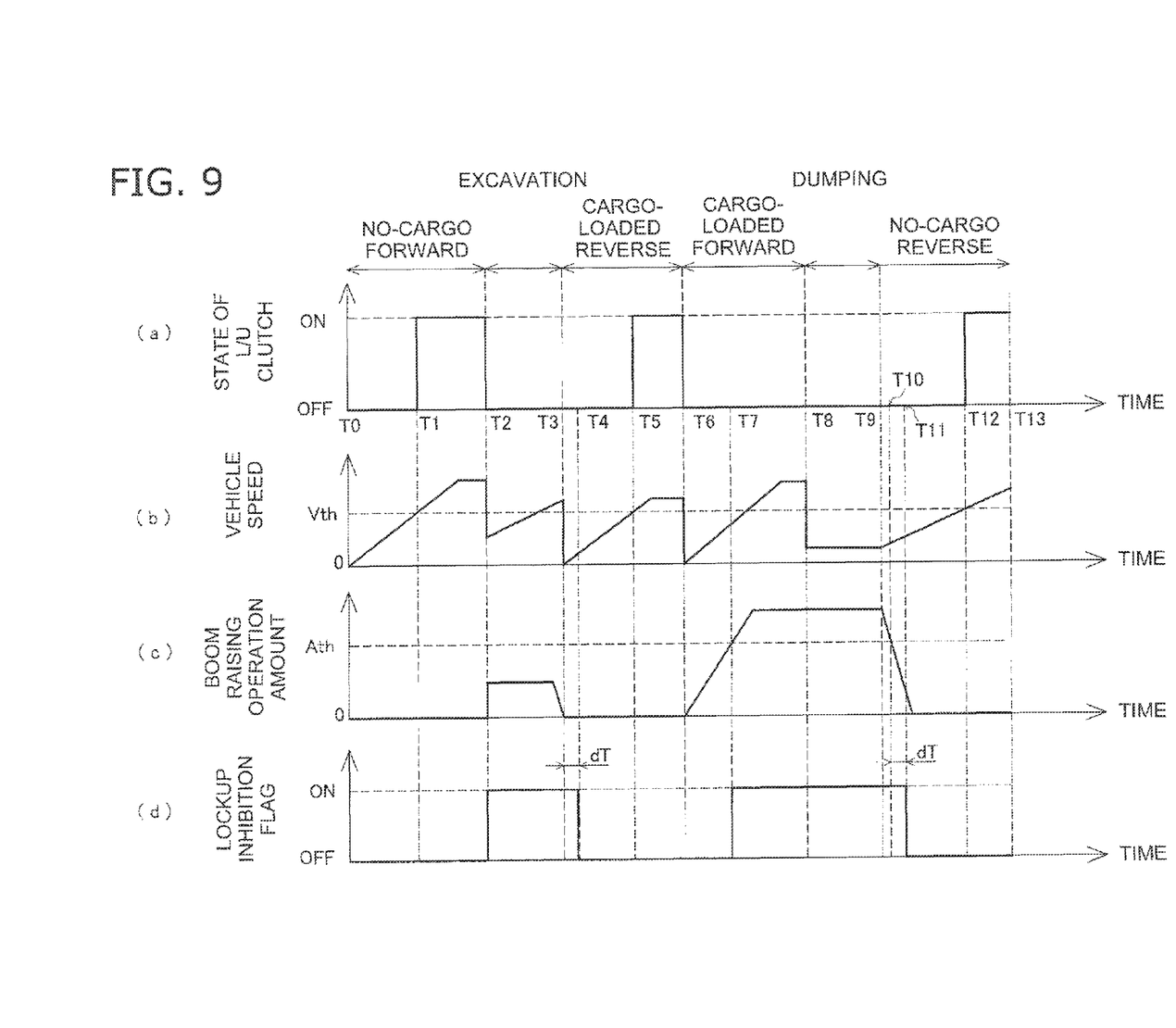
FIG. 9 is a timing chart showing the operation of the lockup clutch in V-shaped work.

FIG. 9 shows a timing chart of the switching of the lockup clutch 27 during V-shaped work. FIG. 9(a) shows the state of the lockup clutch 27. FIG. 9(b) shows the changes in the vehicle speed. FIG. 9(c) shows the raising operation amount of the boom operation member 83a. FIG. 9(d) shows the lockup inhibition flag. The work vehicle 1 moves forward toward the cargo 100 during no-cargo forward (time T0 to T2). Accordingly, the boom 6 is not operated and the vehicle speed gradually increases. At this time, the lockup clutch 27 is in a non-connected state (time T0 to T1) until the vehicle speed reaches the switch speed Vth. Since the load increase conditions described above are not satisfied, the lockup inhibition flag is OFF and lockup inhibition is cancelled. Therefore, when the vehicle speed exceeds the switch speed Vth, the lockup clutch 27 is switched to the connected state (time T1 to T2).

During excavation (time T2 to T3), the work vehicle 1 drives into the cargo 100 and lifts the cargo 100 using the bucket 7. At this time, the load increase conditions described above are satisfied. Accordingly, the lockup inhibition flag is set to ON and lockup is inhibited. Therefore, the lockup clutch 27 is switched to a non-connected state even when the vehicle speed exceeds the switch speed Vth. Also, the lockup clutch 27 is kept in the non-connected state regardless of change in the vehicle speed.

During cargo-loaded reverse (time T3 to T6), the work vehicle 1 moves backwards in a state in which the cargo 100 is carried in the bucket 7. Accordingly, the vehicle speed gradually increases while the boom 6 is kept in a low position. At this time, the lockup clutch 27 is in the non-connected state (time T3 to T5) until the vehicle speed reaches the switch speed Vth. The lockup inhibition flag is set to OFF and lockup inhibition is cancelled at time T4 and thereafter, which is the time at which time dT has elapsed after time T3 when the load increase conditions are no longer satisfied. Therefore, the lockup clutch 27 is switched to the connected state (time T5 to T6) when the vehicle speed exceeds the switch speed Vth.

During cargo-loaded forward (T6 to T8), the work vehicle 1 moves forward toward the loading position 200 in a state in which the work vehicle is carrying the cargo 100 in the bucket 7. At this time, the operator operates the boom operation member 83a in preparation for the subsequent dumping work, and moves the work vehicle 1 forward while raising the bucket 7. Since the load increase conditions described above are satisfied when the raising operation amount of the boom operation member 83a exceeds the operation amount threshold value Ath (time T7), the lockup inhibition flag is set to ON and lockup is inhibited. Therefore, the lockup clutch 27 is kept in a non-connected state (time T7 to T8) even when the vehicle speed exceeds the switch speed Vth.

During dumping (T8 to T9), the operator operates the bucket operation member 84a while the work vehicle 1 slowly moves forward, and drops the cargo 100 in the bucket 7 in the loading position 200. At this time as well, the lockup inhibition flag is set to ON and lockup is inhibited when the load increase conditions described above are satisfied. When the vehicle speed is less than the switch speed Vth, the lockup clutch 27 is kept in the non-connected state even when the load increase conditions are satisfied.

During no-cargo reverse (T9 to T13), the work vehicle 1 moves in reverse away from the loading position 200 while lowering the boom 6. At this time, the raising operation amount of the boom operation member 83a becomes equal to or less than the operation threshold value Ath (time T10), whereupon the load increase conditions described above are no longer satisfied. When the time dT elapses from time T10, the lockup inhibition flag is set to OFF and lockup inhibition is cancelled (time T11). The vehicle speed thereafter gradually increases while the boom 6 is kept in a low position. At this time, the lockup clutch 27 is in a non-connected state until the vehicle speed reaches the switch speed Vth (time T11 to T12). Since the load increase conditions described above are not satisfied, lockup inhibition is cancelled. Therefore, when the vehicle speed exceeds the switch speed Vth, the lockup clutch 27 is switched to the connected state (time T12 to T13).

As described above, in the case that the lockup clutch 27 in the work vehicle according to the present invention is in a non-connected state and the load increase conditions are satisfied, the lockup clutch 27 is inhibited from being switched to the connected state to keep the lockup clutch 27 in the non-connected state. Accordingly, the lock-up clutch 27 is inhibited from being switched to the connected state in a work phase in which a large load is imposed on the work implement 3. When the load increase conditions are satisfied in the case that the lock-up clutch 27 is in a connected state, the lockup clutch 27 is switched from the connected state to the non-connected state. Accordingly, the lockup clutch 27 is switched from the connected state to the non-connected state in a work phase in which a large load is imposed on the work implement 3. It is thereby possible to minimize a reduction in the work efficiency of the work implement 3. Also, lockup travel is used in a work phase in which a large load is not imposed on the work implement 3, whereby fuel consumption can be improved.

One of the load increase conditions is that the work phase of the work implement 3 is excavation. Another of the load increase conditions is that the raising operation amount of the boom operation member 83a is greater than a predetermined operation amount threshold value and the actual speed stage of the transmission 26 is second speed. Lockup is inhibited when at least one of these load increase conditions is satisfied. Alternatively, the lockup clutch 27 is switched from the connected state to the non-connected state. These load increase conditions show that the work vehicle is in a state in which the load imposed on the work implement 3 is predicted to increase. Accordingly, lockup can be inhibited before the load imposed on the work implement 3 increases. Alternatively, the lockup clutch 27 is switched from the connected state to the non-connected state before the load imposed on the work implement 3 increases. It is thereby possible to minimize a reduction in the work efficiency of the work implement 3 when a large load is imposed on the work implement 3.

Cancellation of lockup inhibition is not executed immediately at the point in time that the load increase conditions are no longer satisfied, but is executed after a predetermined time dT has elapsed. Accordingly, it is possible to minimize the lockup clutch 27 from being repeated switched from the connected state to the non-connected state when, e.g., the boom 6 is repeatedly raised and lowered in a short period of time. Therefore, the predetermined time dt can be set to a time around which it is possible to minimize frequent repeated switching of the lock-up clutch 27. For example, the time can be about several seconds.

An embodiment of the present invention was described above, but the present invention is not limited thereto; various modifications are possible within a scope that does not depart from the spirit of the invention.

The load increase conditions are not limited to those described above; it is also possible to use other conditions as long as such lead to an increase in the load on the work implement 3. For example, it is also possible for the load increase conditions to include that the vehicle speed is equal to or less than a predetermined speed threshold value. Specifically, it is possible to determine that the vehicle speed is equal to or less than a predetermined speed threshold value in lieu of the condition in which the speed stage of the transmission 26 is second speed among the load increase conditions described above. The predetermined speed threshold value is set to a value at which it is envisioned that the work vehicle I is traveling at high speed and the driving of the travel device 22 is being given greater priority than the work implement 3. The predetermined speed threshold value is greater than the switch speed of the lockup clutch 27.

Also, one of the load increase conditions may be that the speed stage of the transmission 26 is a low speed stage suitably tier work. A low speed stage suitable for work is preferably second speed as in the embodiment described above. However, a low speed stage suitable for work may be third speed depending on the gear ratio setting in the case that a 5-speed transmission is used, or in other cases.

The conditions described below may he used in addition to or in lieu of the load increase conditions described above. These conditions show that the work vehicle is in a state that leads to an increase in the load imposed on the work implement 3, or shows that an operation has been carried out that leads to an increase in the load imposed on the work implement 3.

(1) The boom angle is greater than a predetermined boom angle threshold value. In other words, the height of the bucket is greater than a predetermined height threshold value.
(2) The work phase is "cargo-loaded."
(3) The bucket angle is greater than a predetermined bucket angle threshold value.
(4) The raising operation amount of the bucket operation member 84a is greater than a predetermined operation threshold value.
(5) The maximum speed stage is a low speed stage suitable for work.

The low speed stage suitable fur work in (5) above is preferably second speed. Also, the low speed stage suitable for work may be third speed depending on the number of speed stages of the transmission 26 and/or the setting of the gear ratio. The low speed stage suitable for work may furthermore be a condition that the speed stage is second speed or less (second speed and first speed).

The load increase conditions may be assessed on the basis of the operative state of the work implement pump 13 or the steering pump 12 (e.g., the pump hydraulic pressure, the swash plate angle, the flow rate, the cylinder speed). No limitation is imposed by the raising operation amount, and it is also possible to use the lowering-operation amount for assessing the load increase conditions in relation to the operation amount of the boom operation member 83a, the bucket operation member 84a, and other work implement operation members.

In the work vehicle according to the embodiment described above, a first controller 10a and a second controller 10b are separately provided, but these may be integrally provided. For example, the functions of first controller 10a and the second controller 10b may be implemented by a single computer. Conversely, the functions of the first controller 10a or the second controller 10b may be shared by a plurality of computers.

The various operation members described above are not limited to the pedals, levers, or other members exemplified above. It is also possible to use dials, switches, and the like.

The lockup clutch 27 may be switched without limitation to the vehicle speed when lockup is not inhibited, and the determination can be made on the basis of other parameters.

The configuration of the work implement 3 is not limited to the bucket 7 and the boom 6; other members may also be used. Also, other work. attachments may be attached to the boom 6 in lieu of the bucket 7.

The speed stages of the transmission 26 are not limited to first speed through fourth speed. The number of speed stages that can be changed may be greater or fewer. The gear change pattern of the transmission 26 by the second controller 10b is not limited to that described above. For example, the gears may be changed in sequence from the first speed in accordance with the increase in speed.

In accordance with the embodiment, it is possible to provide a work vehicle and a method for controlling a work vehicle that can minimize a reduction in work efficiency and improve fuel consumption.

The invention claimed is:

1. A work vehicle comprising:
    an engine;
    a travel device configured to cause the work vehicle to travel, the travel device being driven by a drive force from the engine and including a transmission configured to change gears among a plurality of speed stages;
    a hydraulic pump configured to discharge hydraulic fluid, the hydraulic pump being driven by the drive force from the engine;
    a work implement driven by the hydraulic fluid from the hydraulic pump;
    a torque converter device configured to transmit the drive force from the engine to the travel device, the torque converter device having a torque converter and a lockup clutch;
    a work implement operation member configured and arranged to operate the work implement;
    a work implement operation detector configured and arranged to detect an operation amount of the work implement operation member; and
    a controller configured to switch the lockup clutch between a connected state and a non-connected state in accordance with a travel state of the work vehicle,
    the controller being configured to
        determine whether load increase conditions associated with an increase in load on the work implement are satisfied, and to control the lockup clutch so that the lockup clutch is in the non-connected state when the load increase conditions are satisfied,
        inhibit the lockup clutch from switching to the connected state and to keep the lockup clutch in the non-connected state when the load increase conditions are satisfied while the lockup clutch is in the non-connected state with the transmission in a prescribed speed stage,
        switch the lockup clutch from the connected state to the non-connected state when the load increase conditions are satisfied while the lockup clutch is in the connected state with the transmission in the prescribed speed stage,
    cancel inhibiting of switching the lockup clutch to the connected state when a predetermined time has elapsed from a time point at which the load increase conditions are no longer satisfied, the load increase conditions including that the operation amount of the work implement operation member is greater than a predetermined operation amount threshold value.

2. The work vehicle according to claim 1, wherein
    the work implement has a boom that vertically pivots in accordance with operation of the work implement operation member, and a work attachment attached to a distal end of the boom.

3. The work vehicle according to claim 1, wherein
    the load increase conditions include that a work phase of the work vehicle is excavation.

4. The work vehicle according to claim 1, wherein
    the transmission is configured to change gears from a first speed to a third speed or higher speed stages; and
    the load increase conditions include that a speed stage of the transmission is the second speed.

5. The work vehicle according to claim 1, further comprising
    a vehicle speed detector configured to detect a vehicle speed,
    the load increase conditions including that the vehicle speed is equal to or less than a predetermined speed threshold value.

6. A method for controlling a work vehicle including an engine, a travel device for causing the work vehicle to travel the travel device being driven by a drive force from the engine and including a transmission configured to change gears among a plurality of gear stages, a hydraulic pump for discharging hydraulic fluid and being driven by the drive force from the engine, a work implement driven by hydraulic fluid from the hydraulic pump, a torque converter device for transmitting the drive force from the engine to the travel device and having a torque converter and a lockup clutch, a work implement operation member for operating the work implement, a work implement operation detector for detecting an operation amount of the work implement operation member, the method comprising:
    switching the lockup clutch between a connected state and a non-connected state in accordance with a travel state of the work vehicle;
    determining whether load increase conditions associated with an increase in load on the work implement are satisfied; and
    controlling the lockup clutch so that the lockup clutch is in the non-connected state when the load increase conditions are satisfied,
    inhibiting the lockup clutch from switching to the connected state and keeping the lockup clutch in the non-connected state when the load increase conditions are satisfied while the lockup clutch is in the non-connected state with the transmission in a prescribed speed stage,
    switching the lockup clutch from the connected state to the non-connected state when the load increase conditions are satisfied while the lockup clutch is in the connected state with the transmission in the prescribed speed stage,
    cancel inhibiting of switching the lockup clutch to the connected state when a predetermined time has elapsed from a time point at which the load increase conditions are no longer satisfied, the load increase conditions including that the operation amount of the work implement operation member is greater than a predetermined operation amount threshold value.

* * * * *